(12) United States Patent
Shuholm

(10) Patent No.: US 6,573,759 B2
(45) Date of Patent: Jun. 3, 2003

(54) APPARATUS AND METHOD FOR EXTRACTING DATA VALUES FROM A SIGNAL ENCODED WITH AES3 DATA

(75) Inventor: Kevin J. Shuholm, Grass Valley, CA (US)

(73) Assignee: Nvision, Inc., Grass Valley, CA (US)

( * ) Notice: Subject to any disclaimer, the term of this patent is extended or adjusted under 35 U.S.C. 154(b) by 0 days.

(21) Appl. No.: 09/766,014

(22) Filed: Jan. 18, 2001

(65) Prior Publication Data

US 2002/0093364 A1 Jul. 18, 2002

(51) Int. Cl.[7] .................................................. H03K 9/08
(52) U.S. Cl. ............................................ 327/33; 327/31
(58) Field of Search ............................ 327/33, 170, 31, 327/37, 141, 36

(56) References Cited

U.S. PATENT DOCUMENTS 4,617,526 A * 10/1986 Hikawa et al. ............. 331/1 A

* cited by examiner

*Primary Examiner*—Dinh T. Le
(74) *Attorney, Agent, or Firm*—John Smith-Hill; Smith-Hill and Bedell

(57) ABSTRACT

Apparatus for determining nominal pulse duration values in a signal encoded with an AES3 data stream includes a first circuit for measuring duration of each pulse of the signal and providing a sequence of duration values. A second circuit detects a maximum duration value, corresponding to duration of three bit cells, and provides first and second duration values corresponding to one bit cell and two bit cells respectively.

9 Claims, 1 Drawing Sheet

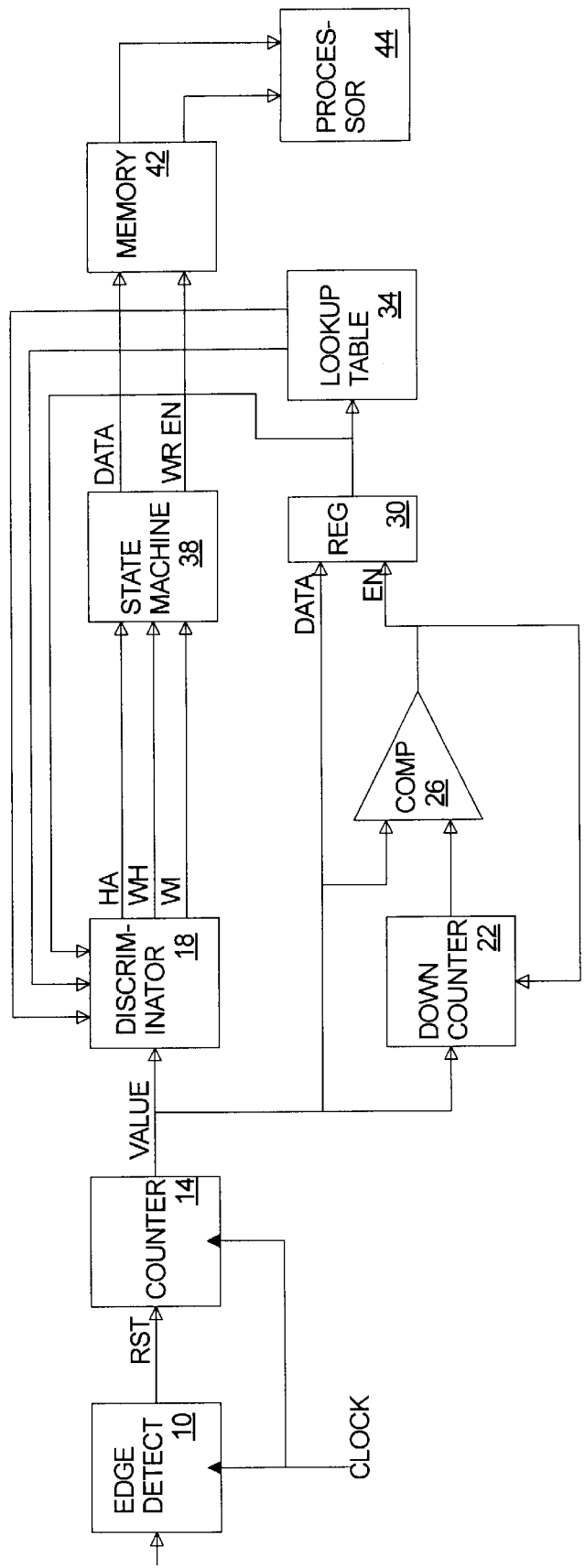

APPARATUS AND METHOD FOR EXTRACTING DATA VALUES FROM A SIGNAL ENCODED WITH AES3 DATA

BACKGROUND OF THE INVENTION

This invention relates to an apparatus and method for extracting data values from a signal encoded with AES3 data.

The Audio Engineering Society and the European Broadcasting Union have established a standard which describes a signal format for distributing two channels of audio material in a digital data stream. The data stream, which is frequently referred to as the AES3 data stream, is composed of frames, and each frame of the AES3 data stream is composed of two channel subframes, which are referred to as subframe A and subframe B, in sequence. The data stream utilizes a biphase mark coded signal. Each source data bit is represented by a two-cell doublet. Each doublet that represents a source data bit begins, and therefore also ends, with a transition. A source data bit 0 generates a doublet with no further transition before the end of the doublet, whereas a source data bit 1 generates a transition between the cells of the doublet. Thus, a source data bit 1 will be represented by the doublet 01 or 10 and a source data bit 0 will be represented by the doublet 00 or 11. Each subframe has 32 doublets and contains data representing one audio sample. In accordance with the AES3 standard, the first four doublets of each subframe constitute a preamble containing at least one occurrence of the three cell sequence 000 or 111. This brief departure from the usual biphase mark coding rules is known as a code violation.

It will be appreciated from the foregoing that a signal encoded with an AES3 data stream is composed of pulses, and each pulse is one, two or three bit cells in duration. In the following description, a pulse that is one bit cell in duration is referred to as a half pulse, a pulse that is two bit cells in duration is referred to as a whole pulse, and a pulse that is three bit cells in duration is referred to as a wide pulse.

The AES3 standard does not prescribe a sample rate and accordingly in a given facility there may be items of equipment operating at different sample rates, such as 44.1 kHz, 48 kHz and 96 kHz. Hitherto, in order to extract the data from an AES3 data stream, it has been necessary to recover the clock information from the data stream and use the recovered clock to sample the signal. This approach is not optimum because a circuit that is designed for extracting data from a data stream at a sample rate of 44.1 kHz might not be able to extract data reliably from a data stream at a sample rate of 96 kHz.

SUMMARY OF THE INVENTION

In accordance with a first aspect of the invention there is provided apparatus for determining nominal pulse duration values in a signal encoded with an AES3 data stream, comprising a first circuit for measuring duration of each pulse of the signal and providing a sequence of duration values, and a second circuit for detecting a maximum duration value, corresponding to duration of three bit cells, and providing first and second duration values corresponding to one bit cell and two bit cells respectively.

In accordance with a second aspect of the invention there is provided apparatus for extracting sample data values from a signal encoded with an AES3 data stream, comprising a first circuit for measuring duration of each pulse of the signal and providing a sequence of duration values, and a second circuit for receiving at least one nominal pulse duration value, corresponding to nominal duration of a predetermined number of bit cells, and comparing the measured duration value with at least one nominal pulse duration value to determine the duration of the pulse relative to the nominal pulse duration value.

In accordance with a third aspect of the invention there is provided a method for determining nominal pulse duration values in a signal encoded with an AES3 data stream, comprising measuring duration of each pulse of the signal and providing a sequence of duration values, and detecting a maximum duration value, corresponding to duration of three bit cells, and providing first and second duration values corresponding to one bit cell and two bit cells respectively.

In accordance with a fourth aspect of the invention there is provided a method for extracting sample data values from a signal encoded with an AES3 data stream, comprising measuring duration of each pulse of the signal and providing a sequence of duration values, receiving at least one nominal pulse duration value, corresponding to nominal duration of a predetermined number of bit cells, and comparing the measured duration value with at least one nominal pulse duration value to determine the duration of the pulse relative to the nominal pulse duration value.

BRIEF DESCRIPTION OF THE DRAWINGS

For a better understanding of the invention, and to show how the same may be carried into effect, reference will now be made, by way of example, to the accompanying drawings, the single FIGURE of which is a schematic block diagram of apparatus in accordance with the invention.

DETAILED DESCRIPTION

The count value that is supplied by the counter 14 is provided to a discriminator 18, a downcounter 22, a comparator 26 and a register 30. The output of the comparator 26 is connected to the load input of the downcounter 22 and to the write enable input of the register 30. If the output signal of the comparator 26 is high, the count value supplied by the counter 14 is written into the register 30 and is also loaded into the downcounter, which then counts down at a fairly low rate. The rate at which the downcounter counts down is selected so that the downcounter will not count to ⅔ or less of its initial value in the subframe interval corresponding to the lowest sample rate. The output of the downcounter is supplied to the comparator 26.

The value loaded into the register 30 is supplied to the address input of a lookup table 34 having a 16 bit data output. The lower byte (bits 0–7) of the word returned by the lookup table in response to the count value of the wide pulse corresponds to the duration of the half pulse whereas the upper byte (bits 15–8) corresponds to the duration of the whole pulse. In the case of the count value being 107, the lower byte is decimal 36 and the upper byte is decimal 71.

The count value that is supplied by the counter 14 is provided to a discriminator 1,8, a downcounter 22, a comparator 26 and a register 30. The output of the comparator 26 is connected to the load input of the downcounter 22 and to the write enable input of the register 30. If the output signal of the comparator 26 is high, the count value supplied by the counter 14 is written into the register 30 and is also loaded into the downcounter, which then counts down at a fairly low rate. The rate at which the downcounter counts down is selected so that the downcounter will not count to ⅔ or less of its initial value in the subframe interval corresponding to the lowest sample rate. The output of the downcounter is supplied to the comparator 26.

Let us assume that a first count value corresponding to the duration of a whole pulse has been loaded into the downcounter 22 (71 in the case of a 44.1 kHz sample rate) and a second count value is provided by the counter 14. If the second count value were larger than the count currently provided by the downcounter, the comparator 26 would provide a high output and the second count value would be loaded into the register 30 and into the downcounter 22. If the second count value were smaller, the comparator would provide a low output and the second count value would not be loaded into either the downcounter 22 or the register 30. Based on this manner of operation, it will be appreciated that no later than the end of the first subframe of the AES3 data stream, the count value loaded into the downcounter 22 and into the register 30 will be the value corresponding to the wide pulse (107) During the second subframe, the count provided by the downcounter will never go below 72 and accordingly a half or whole pulse will have no effect on the register 30. At the end of the second subframe, the downcounter will be refreshed to 107 by the wide pulse in the preamble of the third subframe. It will therefore be seen that the value loaded into the register 30 will be the count value corresponding to the duration of the wide pulse of the input data stream.

The value loaded into the register 30 is supplied to the address input of a lookup table 34 having a 16 bit data output. The lower byte (bits 0–7) of the word returned by the lookup table in response to the count value of the wide pulse corresponds to the duration of the half pulse whereas the upper byte (bits 15–8) corresponds to the duration of the whole pulse. In the case of the count value being 107, the lower byte is decimal 36 and the upper byte is decimal 71.

The count value stored in the register 30 and the upper and lower bytes supplied by the lookup table are supplied as reference values to the discriminator 18, which compares each count value provided by the counter 14 with the three reference values and provides an output indicating whether the count value corresponds to a wide, half or whole pulse. The discriminator does not require precise coincidence between the count value and one of the reference values supplied to the discriminator but on the contrary defines a window about each reference value. For example, if the reference values for half, whole and wide pulses are X, Y and Z respectively, the discriminator might establish as the window for the half pulse reference value the range from X−X/2 to X+X/2, for the whole pulse reference value Y−X/2 to Y+X/2 and for the wide pulse reference value, Z−X/2 to z+x/2.

The discriminator 18 has three outputs HA (half), WH (whole) and WI (wide). When the discriminator compares a count value provided by the counter 14 with the reference values, it asserts a logic high output on the output that corresponds to the outcome of the comparison. Accordingly, the sequence in which logic high levels are asserted at the three outputs of the discriminator corresponds to the sequence of half, whole and wide pulses received by the edge detector.

The three outputs of the discriminator 18 are supplied to a state machine 38 which examines the sequence of half, whole and wide pulses and identifies the preamble. Each of the 24 doublets following the preamble contains the binary value of a source data bit and has a logic value 1 or 0. The state machine 38 derives the logic value for each source data bit from the outputs provided by the discriminator and supplies the 24 data bits for each sample value to a 24 bit wide FIFO memory 42. The state machine 38 also provides a write enable signal for writing to the memory. Accordingly, the 24-bit digital sample values are loaded sequentially in to the memory. A downstream processor 44 generates a read enable signal for reading the digital sample values sequentially from the memory. The sample values read from the memory are supplied to the downstream processor for processing. If the rate at which the processor 44 reads sample values from the memory 42 does not match the rate at which the state machine writes sample values to the memory 42, the processor 44 will repeat or drop sample values as needed.

It will be seen from the foregoing that the apparatus shown in the drawings is able to extract the sample data from the input AES3 data stream without its being necessary to recover a clock and without regard to the sample rate of the data stream.

It will be appreciated that the invention is not restricted to the particular embodiment that has been described, and that variations may be made therein without departing from the scope of the invention as defined in the appended claims and equivalents thereof. For example, although a lookup table is used to provide the reference values corresponding to the duration of the half and whole pulses, it would alternatively be possible to calculate the reference values. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. Apparatus for determining nominal pulse duration values in a signal encoded with an AES3 data stream of data pulses, at least some of which comprise one of one bit cells, two bit cells and three bit cells, the apparatus comprising:

a first circuit for measuring duration of each pulse of the signal and providing a sequence of duration values, and a second circuit for detecting a maximum duration value from the sequence of duration values provided by the first circuit, the maximum duration value corresponding to duration of said three bit cells, and providing first and second duration values corresponding to said one bit cell and said two bit cells respectively.

2. Apparatus according to claim 1, wherein the second circuit comprises a downcounter and a comparator for detecting the maximum duration value and a lookup table for providing the first and second duration values.

3. Apparatus according to claim 1, further comprising a third circuit for receiving the maximum duration value and the first and second duration values and comparing the measured duration value of each pulse with the maximum duration value, the first duration value and the second duration value and providing a corresponding output.

4. Apparatus for extracting sample data values from a signal encoded with an AES3 data stream of data pulses at least some of which comprise one of a half pulse, a whole pulse, or a wide pulse, the apparatus comprising:

a first circuit for measuring duration of each pulse of the signal and providing a sequence of duration values, and a second circuit for receiving at least one nominal pulse duration value, corresponding to nominal duration of said one of a half pulse, said whole pulse, or said wide pulse, and comparing the duration value of a pulse measured by the first circuit with said at least one nominal pulse duration value to determine the duration of the pulse of the signal relative to the nominal pulse duration value.

5. Apparatus according to claim 4, wherein the second circuit receives three nominal duration values, corresponding to nominal durations of a half pulse comprising one bit cell, a whole pulse comprising two bit cells and a wide pulse comprising three bit cells respectively, compares each measured duration value with at least one of the nominal duration values, and provides an output depending on the comparison.

6. Apparatus according to claim 5, wherein the second circuit comprises first, second and third outputs, which it asserts depending on whether the measured duration value corresponds to one bit cell, two bit cells or three bit cells in nominal duration, and the apparatus further comprises a means for extracting sample data values based on the outputs of the second circuit.

7. A method for determining nominal pulse duration values in a signal encoded with an AES3 data stream of data pulses, at least some of which comprise one of one bit cells, two bit cells and three bit cells, the method comprising:

measuring duration of each pulse of the signal and providing a sequence of duration values, and detecting a maximum duration value from the sequence of duration values, the maximum duration value corresponding to duration of said three bit cells, and providing first and second duration values corresponding to said one bit cell and said two bit cells respectively.

8. A method according to claim 7, including receiving the maximum duration value and the first and second duration values and comparing the measured duration value of each pulse with the maximum duration value, the first duration value and the second duration value and providing a corresponding output.

9. A method for extracting sample data values from a signal encoded with an AES3 data stream of data pulses, at least some of which comprise one of a half pulse, a whole pulse, or a wide pulse, the method comprising:

measuring duration of each pulse of the signal and providing a sequence of duration values, receiving at least one nominal pulse duration value, corresponding to nominal duration of said one of a half pulse, said whole pulse, or said wide pulse, and comparing the measured duration value with said at least one nominal pulse duration value to determine the duration of the pulse relative to the nominal pulse duration value.

* * * * *